Nov. 1, 1927.

E. F. PULS

SPEED CONTROLLING DEVICE

Filed Dec. 31, 1924

E. F. PULS

SPEED CONTROLLING DEVICE

Filed Dec. 31, 1924

Nov. 1, 1927. 1,647,580
E. F. PULS
SPEED CONTROLLING DEVICE
Filed Dec. 31, 1924 4 Sheets-Sheet 3

Inventor
E. F. Puls
by Langner, Parry,
Card + Langner
Attys.

Nov. 1, 1927.

E. F. PULS 1,647,580

SPEED CONTROLLING DEVICE

Filed Dec. 31, 1924    4 Sheets-Sheet 4

Inventor
E. F. Puls
by
Langner, Parry,
Card & Langner
Attys.

Patented Nov. 1, 1927.

1,647,580

UNITED STATES PATENT OFFICE.

ERICH FRIEDRICH PULS, OF HAMBURG, GERMANY.

SPEED-CONTROLLING DEVICE.

Application filed December 31, 1924, Serial No. 759,177, and in Germany January 8, 1924.

The change speed gears for motor cars for a plurality of speeds known heretofore have the drawback that they require great attention of the driver for attaining the desired speed in changing, which frequently cause disturbances or even a break down when carried out carelessly or in a false manner.

The object of the present invention is to make this change of speed automatic. This is done in this way that the powers or forces generated within the gearing owing to the counteracting effect of the power of the motor and of the inertia of the car once in motion are made use of for the automatic control or change of speed by the aid of an intermediate device operated by such powers or forces.

The invention can be made use of in connection with the usual gearings controlled by hand or having spur wheels as well as in connection with multiple planetary gearings the speed of which is changed by braking the rotary gearing.

In the drawing several modes of construction of the invention are shown.

The Figs. 3 to 6 are similar views as Fig. 1 shown in various positions.

Figure 1:
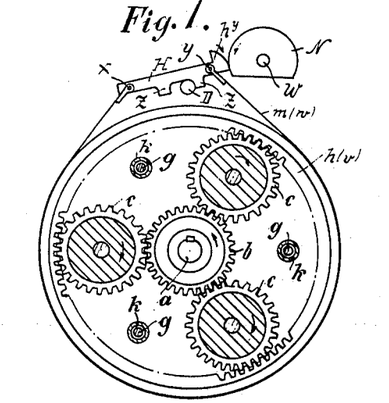
Fig. 1 is a vertical section.
Figure 6:
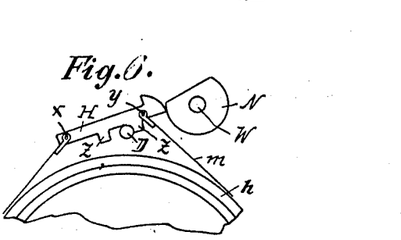

In the Figures 1 and 6 a planetary gear is shown by the aid of which an automatic change is provided for three speeds. The motor shaft $a$ carries at its end the spur wheel $b$ and the driven or load shaft $f$ carries at its end the spur wheel $e$. Both spur wheels engage the two-stepped planet wheels $c$ and $d$, the shafts of which are journaled rotatably in a sectional casing $h$, $i$. The two sections $h$ and $i$ are rotatable on the shafts $a$ and $f$ and are firmly connected with one another by the bolts $g$ and distance pieces $k$. The section $h$ of the casing is with its outer circumference formed as a brake disk, and the section $i$ as a clutch cone $q$. The planet wheels $c$ and $d$ are surrounded by a toothed ring $v$ having inner teeth and also forming a brake disk by its outer circumference. On the shaft $f$ is mounted by the aid of a flat key $t$ slidably but not rotatably a coupling disk $s$. A spring $u$ surrounding the shaft presses with one end against an annular shoulder $u^x$ and with its other end against the disk $s$ by the intermediary of a flanged sleeve $u^2$. Normally the disk $s$ is relieved of the pressure of the spring $u$, when, however, the spring $u$ is allowed to act on the disk $s$ the cone $r$ on this disk is pressed against the cone $q$ of the section $i$ of the casing and thus firmly locking the casing with the shaft $f$, and thus by the intermediary of the gearing also locking the casing with the shaft $a$.

The brake disks $h$ and $v$ are surrounded by brake bands $m$ and $w$, the ends of each of which being connected with the double-armed lever H at the points $x$ and $y$. The levers H are shiftable to a limited extent on the rod D, this shifting being limited by stops $z$. These levers normally are lying at an angle in such way, that the shorter arm $D^y$, is higher than the longer arm $D^x$. In this position the lever H rests with its front end or nose $h^y$ against a cam N mounted on a shaft W. The several cams N on the shaft W are so situated against one another corresponding to the different speeds in this way that they one after the other on rotation of the shaft W give way to the levers H to allow them to be displaced on the rod D.

The operation of the gearing for automatical change of speed is as follows: Let it be assumed that the driving shaft $a$ is rotating and the brake disk $h$ is held against the rotation of the brake band $m$. Then the planet wheels $d$ and $c$ will transmit rotation to the shaft $f$ by the spur wheel $b$ and thus the smallest speed is in operation. When now the brake disk $h$ is released and the brake band $w$ is drawn tight to hold the toothed ring $v$ the rotation of the shaft $a$ will be transmitted to the shaft $f$ in two ways; firstly by the own rotation of the planet wheels $c$ and $d$ above their axes, and secondly by the rolling of these wheels on the toothed ring $v$ which causes a running round of the shafts of the planetary axes and take effect on the shaft $f$ in the same manner being in engagement therewith, so that the sum of the two rotative movements will cause the second speed of the shaft $f$. The third speed will be effected by allowing the spring $u$ to act against the disk $s$ thus locking the gearing altogether, and therefore causing a rotation of the shaft $f$ from the shaft $a$ in the proportion of 1:1.

The automatic change takes place as follows: When the shaft $a$ is rotating and the shaft $f$ is held at rest the brake disks $h$ and $v$ will be rotated, which according to the illustrations in the drawings may be called clockwise. If however the revolutions of the shaft $f$ per minute are greater than that of the shaft $a$, which can happen when the load or car is in motion, and suddenly the rotation of the shaft $a$ is reduced by a brake or otherwise, the inertia of the car or load in motion will cause a counter-clockwise rotation of the brake disks $h$ or $h$ and $v$.

Figure 3:
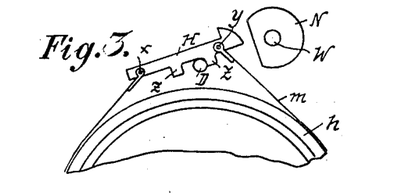
Figure 4:
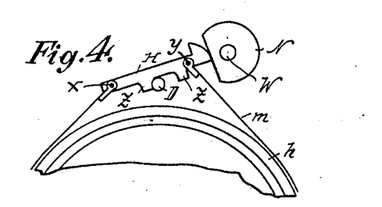
Figure 5:
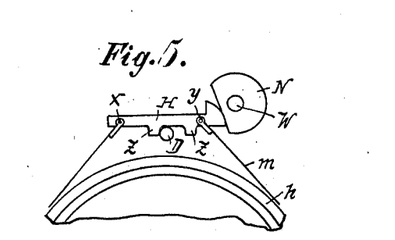

If the shaft $a$ is rotating and the shaft $f$ is at rest the clockwise rotation of the brake disks $h$ and $v$ will have the effect of a slight pull on the brake bands $m$ and $w$, bearing to a slight extent on the brake wheels, which pull will act at $y$ on the lever H. Since the distance of $y$ from the rod D is comparatively small the length of the leverage is not sufficient to cause a rotation of the lever H about the rod D. The lever therefore will be in a position as shown in Fig. 1. When now the shaft W is rotated by the aid of a spring ($K^7$, later on more fully described with reference to Fig. 4) the first cam N belonging to the first lever H of the brake band $m$ will be in a position as shown in Fig. 3. The brake band $m$ owing to the pull exerted by the clockwise rotation of the brake disk $h$ causes a movement of the lever H, the brake band acting on it at an obtuse angle against the cam $n$ of the shaft $w$ into the position shown in Fig. 4. Hereby the points $y$ and $x$ on the oblique plane move away from the axis of rotation of the disk $h$, and therefore the brake band will become tight around the brake disk $h$. At the same time the leverage $D^y$ increases and therefore causes a rotation of the lever H about the rod D, so that the brake band $m$ is now fully drawn tight, Fig. 5. The disk $h$ is now firmly held tight by the braking action and therefore the smallest speed is in operation.

When the driven shaft $f$ is rotating fully to correspond to the desired smallest speed the clockwise pressure of the brake disk $h$ is discontinued, and on a sudden reduction of the number of revolutions of the shaft $a$ the brake band $m$, owing to the inertia acting on the shaft $f$ of the load in motion, causes a counter clockwise rotation. The consequence is that the lever H slips back into its original position, that is to say into the position shown in Fig. 6. The even draft of the shaft W, which could not rotate as long as the cam belonging to the brake band $m$ was held against rotation by the lever H, now causes the shaft W to rotate, so that the next following cam N corresponding to the brake band $w$ gives way to the lever H belonging to the second brake band so that the clockwise rotation of the brake disk $b$ causes an automatical braking or stoppage in the same manner, so that now the second speed is in operation. When now the second speed is automatically changed in the similar manner as above described a further rotation of the cam shaft W releases the spring $u$ by the aid of suitable not shown means in such way that the cone $r$ is pressed against the cone $q$, and thus the complete gearing is locked, and therefore the highest speed is in operation. By rotating the shaft W backwardly into its original position of rest, Fig. 1, a complete throwing out of gear is effected. For operating the gearing therefore it is only necessary to cause a continuous draft or pull on the shaft W. The change of speed takes place automatically by the counteracting forces between the motor and the car or load in motion.

Figure 2:
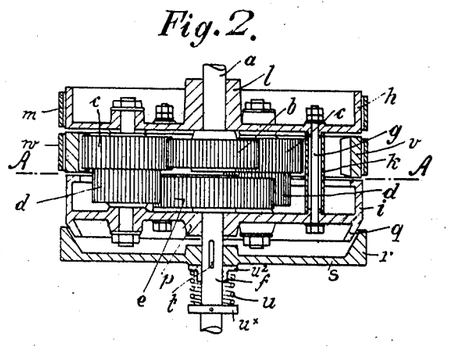
Fig. 2 a horizontal section of the multiple speed planetary gearing.
Figure 7:
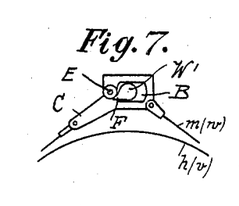
Figs. 7 to 9 show a modification in different positions.
Figure 8:
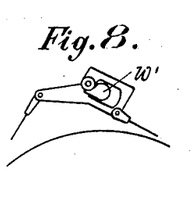
Figure 9:
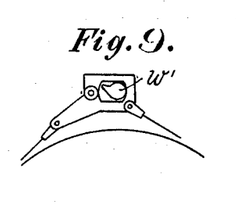

In the modification shown in Figs. 7, 8 and 9 the planetary gearing shown in Figs. 1 and 2 is also used. The cam shaft W' runs through an opening $b$ of the levers C, which are connected with the ends of the brake bands $m$ and $w$ in a similar manner as in the modification shown in Figs. 1 to 6 the levers H are connected. Every lever C is provided with a stud E adapted to be engaged by a cam F on the shaft W'. In Fig. 7 the parts are shown in a position of rest. By rotating the shaft W' in clockwise direction a pull is exerted on the brake bands $m$ and $w$, Fig. 8. In the position shown in Fig. 9 the back rotation of the brake bands $h$ and $v$ respectively moves the stud E out of engagement with the cam F, so as to relieve automatically the brake band $h$ or $v$ respectively to provide for an automatic change of speed, whereupon the next following cam is made to act to allow the next following change of speed to take place. Contrary to the construction shown in Figs. 3 to 6 the clockwise rotation of the brake disks will only be used for an automatic adjustment for allowing a change of speed, while the change of speed itself is caused positively by the rotation of the cam shaft W'.

Figure 10:
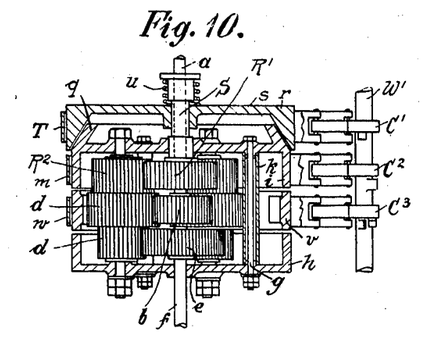
Figs. 10 and 11 illustrate an example of construction of a planetary gearing similar as Figs. 1 and 2 but having three forward speeds and a reverse.
Figure 11:
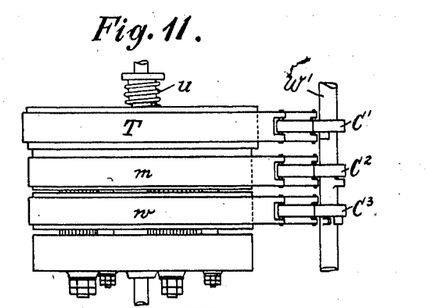

In the construction shown in Figs. 10 and 11 a gearing is used for three different forward speeds and a backward speed or reverse with automatic means for changing. This gearing is generally identical with the construction shown in Figs. 1 and 2 as may be understood from comparing these figures with Figs. 10 and 11, the similar reference letters referring to similar parts. There is only a difference inasmuch as in the construction in Fig. 10 the driving shaft $a$ is surrounded by a hollow shaft S carrying a spur wheel R' arranged for reverse motion, while the planet wheels $d$ are provided with a third step or spur wheel R². In this case moreover the coupling disk $s$ is not mounted on the driving shaft $a$ but on the hollow shaft S slidably but not rotatably. Moreover the coupling disk $r$ is constructed as a brake disk and may be held by friction of a third brake band T. The speed change shaft W' carries cams and free levers C', C², C³, such as are shown in Figs. 7 and 8, connected with which are the brake bands T, $m$ and $w$.

The operation is as follows: When the shaft $a$ is rotating and the shaft $f$ is at rest, the speed change shaft W' is set to rotate, the middle cam F engages the stud E of the lever C² and exerts a pull on the brake band $m$ to hold the casing $i$, $h$ against rotation, so that the first or smallest speed is attained. When the driven shaft $f$ is rotated with a revolution corresponding to the shaft $a$ and suddenly the rotation of the shaft $a$ is reduced in its speed a counter-clockwise rotation of the brake disk $i$ sets in and thus causes a release of the brake band $m$ and a throwing out of gear of the first speed, the next following cam F catching hold of the stud E of the lever C³. The latter now also exerts a pull on the corresponding brake band $w$ to cause the second speed to come into operation until this again is automatically cut out. A further rotation of the shaft W' will effect by a suitable device (not shown) the release of the pressure of the spring $u$ against the disk $s$, so as to lock the complete gear and to allow the great speed to operate the cutting out of this speed which takes place by turning the speed change shaft W' back into its original position. By a further rotation of the speed change shaft W' in counter-clockwise direction the lever C' and thus the brake band T is drawn tight so as to cut in the backward movement or reverse. For operating the gearing it is necessary that the shaft W is given a tendency to continuously rotate when it is desired to change the speed, while all speeds are cut out by rotating backwardly the shaft W' into its position of rest.

Instead of the speed change mechanism shown in Figs. 7-9 the gearing may also be provided with means as shown in Figs. 3-6. The difference between these two modes of construction consists only in this that an even pull or draft exerted on the speed change shaft W (Figs. 3-6) is only used for rotating this shaft, while according to the construction shown in Figs. 9-11 this draft on the speed change shaft W' must be so strong that it can be used also for pulling the brake bands. In both modes of construction it is sufficient to throw the speed change shaft again into operation when the vehicle is once in motion and the speed change shaft is for a moment thrown out of gear, whereby the various speeds already attained will on the backward rotation of the brake disks be automatically saved from being again thrown into gear so as to render a change into a smaller speed impossible.

The construction shown in Figs. 3-6 can also be so arranged that the change can be only effected by the motor power and by the speed change shaft without making use of the inertia of the rolling vehicle. It is only necessary to construct the cams N in such way that by the first movement of the shaft W firstly the first cam gives way to the lever H, then on a further rotation the next following cam gives way to the second lever H, whereby however the first cam does not engage again the first lever so that now by putting in the next speed the previous speed is cut out. This arrangement allows of a voluntary change of the gearing according to the rotation of the shaft W, whereby an automatic putting in of the speed takes place each time, and therefore a backward putting in of the smaller speed is impossible. Any kind of brakes may be used, by way of example a band brake has been shown. The essence of the invention consists therein that owing to the counter-action between the motor power and the rolling power of the load in the gearing forces are created, which by the aid of an intermediate member operated by such powers, an automatic change of speed is provided.

In the construction shown in Figs. 3-6 the arrangement is such that the brake bands are connected with double-armed levers which are shiftable to a limited extent on their pivot points tangentially, and in normal position are each prevented by a cam from being shifted by the action of the brake band of the gear to be held against rotation, the cams being adapted to give way to the said levers, to allow them to move in the direction of the draft of the brake band, and finally to slip back into the normal position.

In a further mode of construction the movement of the levers attached to the brake bands and movable to a limited extent on their pivots, are controlled by two cams arranged opposite to one another on both sides of the pivots of said levers and operatively connected with one another in such manner, that the levers are positively guided by the shape and the rotative movement of the cams in prescribed paths. This has the advantage that the movements of the levers are carried out progressively and evenly to allow of a gentle and timely adjustable engaging of the brake bands. The slipping back of the levers into their position of rest in this construction as well as in the others takes place not only on a counter-clockwise rotation of the gear previously held against rotation, but also even then, when the clockwise pressure on the gear is discontinued as soon as the complete balance between the number of revolutions of the motor and the rolling load is effected, the cams being rotated evenly and pushing the levers back into their normal position.

According to a further feature of the invention the cams (not only in case of a single cam for each lever but also in case of pairs of opposite cams) can be so shaped and arranged relatively to one another, that on releasing one lever by the corresponding cam, by the further rotation of the cam shaft, the next following lever is also released from its cam, but the first lever is not locked again by its cam, so that not until putting in the next speed the previous speed is cut out.

A further mode of construction can be carried out in this way, that the single or pairs of cams are so shaped or arranged relatively to one another, that by every change of speed before one lever is fully returned into its position of rest, the next lever has already commenced its controlling movement, so that not until the putting in of the next higher speed the previous speed is fully cut out. This arrangement allows of an automatic change of speed without making this change recognizable.

Finally the invention embodies a further improvement inasmuch as the complete controlling mechanism or one part of it is movably arranged in such manner that it can be lowered with regard to the main axis of gearing, and that thereby the brake bands are positively relieved. In this way the driver is in a position at every desired moment to make the automatic speed change means completely ineffective.

Figure 17:
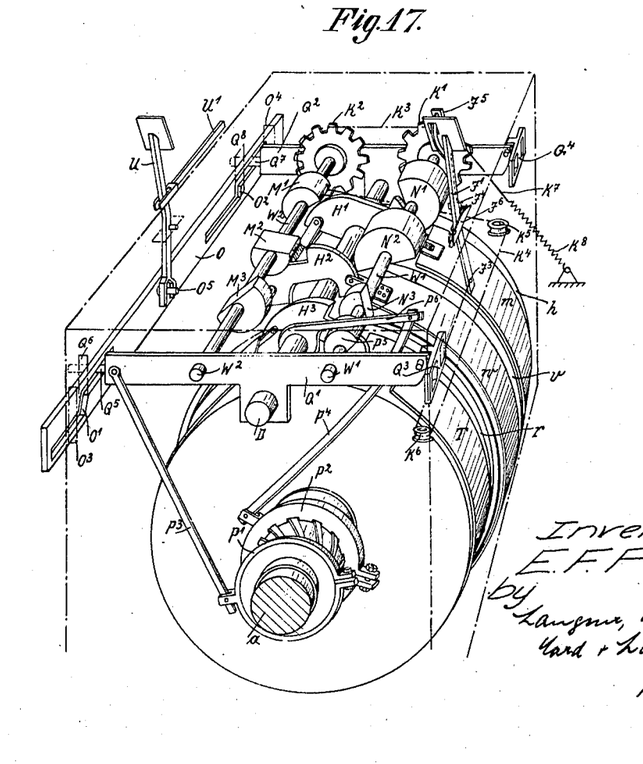
Fig. 17 is a perspective view of the gearing shown in Figs. 12 to 16.

In the construction shown in Figs. 12–16 a cam does not act alone on the shorter arm of the lever H but there is also a cam acting on the longer arm of this lever. Thus it will be seen that besides the cam N used heretofore there is a second cam M. The two cams M and N are mounted on shafts W' and $W^2$ which are in operative connection by suitable gears, for instance sprocket wheels K' and $K^2$ mounted on said shaft, around which a chain $K^3$ is running as indicated in the drawing. The end $K^7$ of the said chain $K^3$ is connected with a helical spring $k^3$ (as shown in Fig. 17), while the other end of the chain is in connection with a foot lever or pedal J' by a wire $K^4$ also shown in Fig. 17. Every lever H is provided with stops Z and is arranged to slide on the rod D to an extent limited by the said stops. The brake bands m or w and T respectively, which serve for retarding or stopping the rotary movement of the spur wheels h, v or r respectively, are connected with the lever H at x and y. Since every lever is guided and controlled at both ends by cams there is the result that the lever is positively moved or guided until its final control by the rotation of the cam shafts W' and $W^2$. This will be understood by observing that when the cam N gradually gives way to the lever H, so as to allow it to rise at an angle over the pivot rod D in such direction that its distance from the axis of the gearing is increased, the rocking of the lever H round the pivot rod D takes place gradually corresponding to the rotation of the cam M. Thus there is a gentle and timely adjustable engaging of the brake bands m, w, T on the rotatable gears h, v and r.

Figure 12:
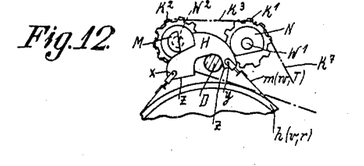
Figs. 12 to 16 are similar views as the Figs. 3 to 6 of another modification.
Figure 13:
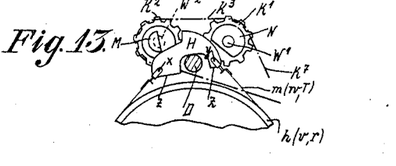
Figure 14:
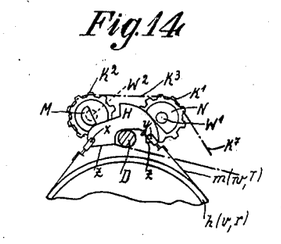
Figures 15, 16:
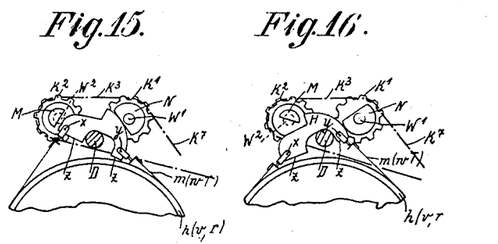

In Fig. 12 the position is shown in which the gearing is running idle or free. In the position shown in Fig. 13 the lever H starts to move towards the cam N. In the position shown in Fig. 14 the cam M gives partly way to the longer arm $D^x$ of the lever H, and thus the latter starts to rock about the pivot rod D. In the position shown in Fig. 15 the cam N is given way to the lever H completely and the latter is pulled fully tight. As long as now the clockwise pressure is upheld by the gear h on the brake band m the pull on the end $K^7$ of the chain $K^3$ cannot give the cam N a further rotation, since the latter finds resistance against the lever H. When the pressure is discontinued either the cam N presses the lever H back into its position of rest, or a counter-clockwise rotation of the retarded gear h pulls the lever H into its position of rest, Fig. 16, by the aid of the brake band m connected at the point x, so that a further rotation of the cam shafts W and $W^2$ is possible, and the next following lever can be acted upon in a similar manner.

Figure 18:
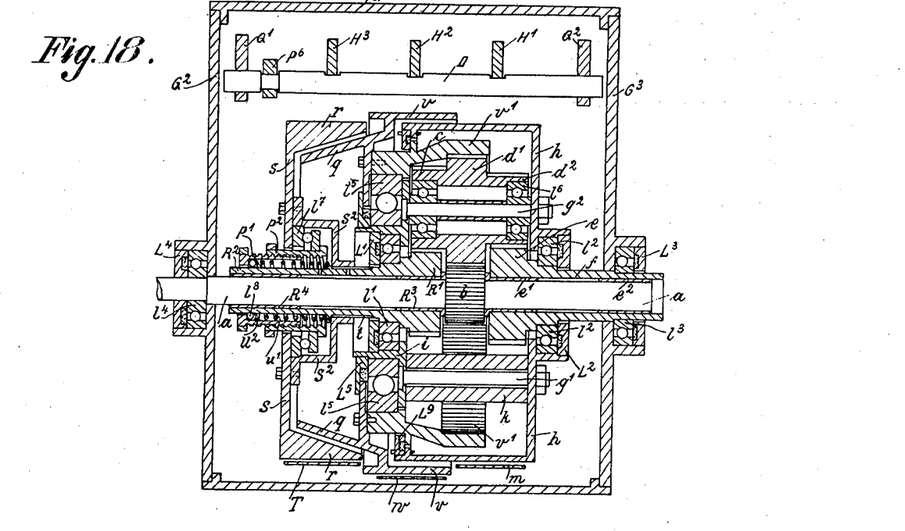
Fig. 18 is a central section of the gearing shown in the last named figures.

The construction shown in the Figs 17 and 18 is adapted for three different forward speeds and a reverse. The driving shaft a is here also carrying a spur wheel b and is journaled in ball bearings $l^4$ in the wall $G^2$ of the casing. The driven hollow shaft f carries at its end a toothed wheel e and rotates on the shaft a by the aid of sleeves e' and $e^2$ made of bronze. This shaft is journaled in ball bearings $l^3$ in the wall $G^3$ of the casing. The hollow shaft $R^2$ serves for the reverse or backward rotation, and carries at its end the spur wheel R' and rotates on the shaft a by the intermediary of bronze sleeves $R^3$ and $R^4$. The sections h and i of the inner casing are connected with one another by bolts g' and distance pieces k. The inner casing rotates by the intermediary of the ball bearings l' and $l^2$ about the main shaft a or the hollow shafts $R^2$ and f respectively. The casings h and i carries three planetary shafts $g^2$, on which by ball bearings $l^6$ three stepped planet gears c, d' and $d^2$ rotate, which themselves are in engagement with the spur wheels R', $b$ and $e$. The inner rings of the ball bearings $l^6$ are held fast by distance pieces.

Round the highest step $d'$ of the planet wheels a ring $v'$ having inner teeth is arranged which by the aid of a ball bearing $l^5$ is journaled in the casing section $i$, and this toothed ring is connected with a disk formed by the brake disk $v$ and clutch cone $q$. The clutch cone $q$ works together with an outer clutch cone $r$ formed on the disk $s$. The disks $s$ and $s^2$ are bolted together and the latter is adapted to slide in grooves $t$ on the reverse shaft $R^2$ in axial direction without being able to rotate thereon. A helical spring $u'$ surrounding the hollow reverse shaft $R^2$ presses with one end against a flange or ring $u^2$ attached or screwed on to the shaft $R^2$, and with its other end against the disk $s^2$, so as to be adapted to press the cone $r$ against the cone $q$. For releasing the gearing serves a two-part steep thread between the inner sleeve $p'$ and the outer sleeve $p^2$. The inner sleeve $p'$ rotates on balls $l^8$ on the ring $u^2$, and the outer sleeve $p^2$ is provided at its end with a horizontal pressure bearing $l^7$ by which on pulling home the steep thread the spring $u'$ is pressed together and the cone $r$ moves away from the cone $q$. Packings $L'$, $L^2$, $L^3$, $L^4$ and $L^5$ are provided with the corresponding ball bearings $l'$, $l^2$, $l^3$, $l^4$ and $l^5$ respectively. The planetary gearing casing $h$, $i$ will be also made tight by a packing ring $L^6$.

The parts $h$, $v$, $r$ formed as brake disks can be retarded or stopped by the brake bands $m$, $w$, $T$, which are connected to the lever $H'$, $H^2$, $H^3$ respectively. For operating the steep screws $P'$, $P^2$ a lever $P^6$ is provided operating by the aid of the rod $P^4$ and arranged rotatably on the shaft $D$ serving as pivot rod for the levers $H'$, $H^2$ and $H^3$ and bearing against the cam $P^5$. The latter is mounted on the shaft $W'$ of the cams $M'$, $M^2$ and $M^3$. On this shaft $W'$ is mounted the sprocket wheel $K'$ connected with the sprocket wheel $K^2$ of the cam shaft $W^2$ by the chain $K^3$, the end $K^7$ of which being connected with the spiral spring $K^8$ as mentioned above. A wire $K^4$ connects the other end of the chain with the pedal lever $J'$ at $J^3$ and runs over the rollers $K^5$ and $K^6$. The pedal lever $J'$ is provided with a locking pawl $J^4$ which can be released by a pressure knob $J^5$ adapted to engage a groove in the segment or quadrant $J^6$ to lock the lever in the idle or free run position.

The operation of the gearing is as follows: For starting it is sufficient to press on the knob $J^5$, whereupon the spring $K^7$ sets the cam shafts $W'$, $W^2$ to rotate by the aid of the chain $K^3$. Thus firstly the first speed (lever $H'$), then the second speed (lever $H^2$) and finally the third speed (lever $P^6$) is put in. For returning into the idle or free run position the lever $J'$ is returned by foot into the idle position. The reverse is started by pressing down the knob $J^5$ and the lever $J'$ in the same direction to its full extent, so as to bring the lever $H^3$ into its operative position.

Means are provided which enable the gearing to be set into the idle or free run position by at the same time relieving all brake bands $m$, $w$ and $T$ without rotating the cam shafts $W$ and $W^2$ backward for throwing the speeds out. This object in view the cam shaft $W$ and $W^2$ as well as the pivot rod or shaft $D$ are journaled into levers $Q'$ and $Q^2$, which are pivoted with one end to brackets $Q^3$ and $Q^4$ connected adjustably to slots of the outer casing shown in Fig. 19 in dotted lines. The other ends of the lever $Q'$ and $Q^2$ are provided with studs $Q^5$ and $Q^7$ which are guided at right angles to the shafts $W'$ and $W^2$ in slots $Q^6$ and $Q^8$ of the wall of the casing. The studs $Q$ and $Q^7$ also engage the slide $O$, which is guided in slots $O^3$ and $O^4$ of the end walls of the casing parallel to the cam shafts. For allowing the studs $Q^5$ and $Q^7$ to pass cam slots $O'$ and $O^2$ are provided in the slide $O$ shaped to lower the studs $Q$ and $Q^7$ when the slide $O$ moves horizontally, so as to oscillate the lever $Q'$ and $Q^2$ about their pivots in the brackets $Q^3$ and $Q^4$. The result is a lowering of the levers $H'$, $H^2$, $H^3$, and thus the brake bands $m$, $w$, $T$ are relieved.

Figure 19:
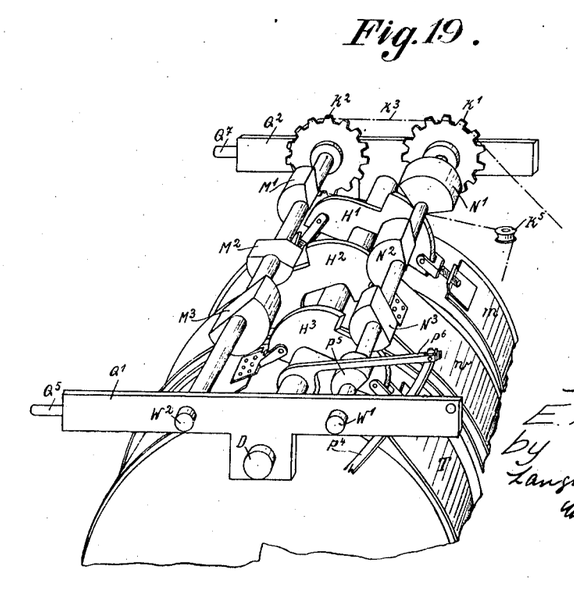
Fig. 19 is a perspective view of another modification.

The sliding movement of the slide $O$ is carried out by the aid of the pedal $U$ which is connected to the rod $U'$ of the usual foot brake (not shown). The lever $U$ is bifurcated at its end and engages the stud $O^5$ on the slide $O$, so that in depressing the pedal $U$ the slide $O$ is moved along the slot $O^3$ and $O^4$, and the studs $Q^5$ and $Q^7$ are thus compelled to move downwardly corresponding to the shape of the cam slots $O'$ and $O^2$. As soon as the levers $Q'$ and $Q^2$ rock downwardly all brake bands are relieved, and there is no possibility of pulling them tight. If the highest speed is already put in when the pedal $U$ is pressed downwardly this high speed is also again put out by the aid of the rod $P^3$ which operates the steep screw thread $P'$.

This device for relieving the brake bands can also be made use of in connection with the other modes of construction where there is only one cam employed for the brake lever $H$.

In the construction shown in Fig. 21 the cams $N'$, $N^2$ and $M'$ and $M^2$ are not fully shaped to form half a cylinder as is the case in the constructions described above, but its operating surface is smaller than that of half a circle. These cams now are so constructed that on the initial movement of the cam shafts $W$ and $W^2$ firstly the cam $N'$ gives way to the lever $H'$ and thereupon on a further rotation the following cam N² allows the lever H² also to pass, but by putting in the next following speed cuts out the previous speed. The same is repeated on further control for the next following speed. This arrangement allows of a voluntary control of the gearing corresponding to the rotation of the shafts W' and W², whereby an automatic change or control of speed always takes place, that is to say a putting in or a smaller speed is impossible. This change of speed is only carried out by the motor power and the cam shaft without making use of the inertia of the rolling vehicle.

The cams N and M can be so shaped that on every change or controlling operation at first the pull of the spring on the chain causes a partly pushing back of the lever H' towards its position of rest, whereby at the same time the next following lever H² or the locking lever P⁶ is operated so that by the putting in of the next higher speed the previous speed is perfectly cut out. By this arrangement the automatic control or changing of speed takes place without recognizing the change.

In place of the construction shown in Fig. 17 for lowering the brake mechanism instead of the latter or a part of such a frame can be used or any other suitable guide, by the aid of which it can be lowered towards the axis of gearing for the purpose of relieving the brake bands or for throwing the steep thread screws into gear.

Moreover the locking of the gearing for the highest speed can also be carried out in different ways, for instance thereby that the ring v' with inner teeth is journaled on the other part h of the casing and the section i of the casing be constructed as a clutch cone, so that the disk s is pressed against the casing i, h. Moreover a fly wheel for the motor can be mounted on the shaft a and constructed as a clutch cone against which the cone r can be pressed whereby it would be sufficient to reverse the steep screw thread and whereby the disk s, that is to say the spur wheel R', be locked with the main shaft a, and therefore with the spur wheel b. The main advantage of the last named arrangement will be found in this that the shaft a, the fly wheel and the disk s are running in the same direction with different speed so as to allow of a particular soft coupling. The locking of the gearing can also be carried out in any other manner by coupling two gears with different numbers of revolution.

Common to all last described constructions of the invention is the fact that the putting in of the intermediate speeds between the highest and lowest is effected by one or more rings with inner teeth in continuous engagement with the planet wheels and that the clockwise rotation of the brake disks is made use of for partly or fully automatically effecting the control and that the counter-clockwise rotation of the brake disks effected by the gear teeth falling back to contact one another with their opposite faces when the rolling load is in motion, is made use of for automatically putting in or out the speeds.

If the automatic control of speed is not required, the clockwise or counter-clockwise rotation acting on the brake disks can be employed for the automatic speed adjustment alone without controlling the putting in of the speed.

For the sake of safety eventually a special lever or the like operated by hand or foot may be employed for the reverse or backward driving. In such case the lever H³ may be dispensed with. In place of cams mounted on rotary shafts reciprocating slides or locking bolts, keys or other controlling means may be used, eventually connected with one another in parts.

The invention may be employed not only for motor cars but also for any motor driven machines, in which a change speed gearing forms part of the driving mechanism.

I claim:

1. A speed controlling device for motor driven machines, particularly for motor cars, comprising a drive, a driven load, a multiple change speed gear of the planetary type intermediate of said drive and said load, a brake for the train of gears for each speed of said planetary change gear comprising a circular body carrying a brake surface and a movable member consisting of a brake band and a two-armed lever, the two arms being of different lengths, a pivot rod on which the lever is adapted to slide to a limited extent and to rock transversely to said pivot rod and means to normally hold the movable members of all the brakes in released position and constructed to secure the operative position of said movable members successively.

2. A speed controlling device, comprising a planetary gearing consisting of a driving shaft, a driven shaft, a spur wheel on each shaft, planet wheels engaging said spur wheels, an inwardly toothed ring surrounding and engaging the said spur wheels, a casing in which the said planet wheels are journaled, brake bands one surrounding the said ring and another the casing to form band brakes, two armed levers to the ends of which the brake bands are attached, a pivot rod which is mounted parallelly to the axis of the gearing and on which the said levers are adapted to rock and to slide to a limited extent transversely to said pivot rod, a cam shaft journaled to a fixed frame or casing parallel to the axis of the gearing, cams on the said cam shaft against which the said two armed levers bear by the brake band tending to pull the levers in the direction towards the said cams owing to the frictional contact of the brake disk with the brake band.

3. A speed controlling device, comprising a planetary gearing consisting of a driving shaft, a driven shaft, a spur wheel on each shaft, planet wheels engaging said spur wheels, an inwardly toothed ring surrounding and engaging the said spur wheels, a casing in which the said planet wheels are journaled, brake bands, one surrounding the said ring and an other the casing to form band brakes, two armed levers to the ends of which the brake bands are attached, a pivot rod, which is mounted parallelly to the axis of the gearing and on which the said levers are adapted to rock and to slide to a limited extent transversally to said pivot rod, a cam shaft journaled to a fixed frame or casing parallel to the axis of the gearing, cams on the said cam shaft against which the said two armed levers bear by the brake band tending to pull the levers in the direction towards the cams owing to the frictional contact of the brake disk with the brake band, stops on the levers to limit the sliding movement of said levers on the pivot rod, the pivot rod being so positioned that the brake bands in all positions of the levers form with the levers an obtuse angle and that the leverage from the center of the pivot rod to the point of attachment is smaller on the side next to the cam than the leverage on the other side of the pivot rod.

4. A speed controlling device comprising a planetary gearing consisting of a driving shaft, a driven shaft, a spur wheel on each shaft planet wheels engaging said spur wheels, an inwardly toothed ring surrounding and engaging the said spur wheels, a casing in which the said planet wheels are journaled, brake bands one surrounding the said ring and an other the casing to form band brakes, two armed levers to the ends of which the brake bands are attached, a pivot rod which is mounted parallelly to the axis of the planetary gearing and on which the said levers are adapted to rock and to slide to a limited extent, two cam shafts journaled parallel to the axis of the gearings each to one side of the rod, cams on said cam shaft opposite the said levers to positively guide each lever on both sides of the pivot rod, the two cam shafts operatively connected with one another to move in unison to compel the levers to move in prescribed paths.

5. A speed controlling device according to claim 3 characterized by the cams being so shaped and arranged relatively to one another, that on the continuous rotation of the cam shaft each lever after being operated on its cam and therefore released is not locked again by the cam, when the next following lever is operated and released by the corresponding cam, to throw out a speed by putting in the next higher speed.

6. A speed controlling device, comprising a planetary gearing consisting of a driving shaft, a driven shaft, a spur wheel on each shaft, planet wheels engaging said spur wheels, an inwardly toothed ring surrounding and engaging the said spur wheels, a casing in which the said planet wheels are journaled, brake bands one surrounding the said ring and another the casing to form band brakes, two armed levers to the ends of which the brake bands are attached, a pivot rod which is mounted parallelly to the axis of the planetary gearing and on which the said levers are adapted to rock and to slide to a limited extent, a cam shaft journaled parallel to the axis of the gearings to one side of the rod, cams on said cam shaft opposite the said levers to positively guide each lever, the cam shaft operatively connected with driving means to compel the levers to move in prescribed paths, means to lower the pivot rod to loosen the brake band.

7. A speed controlling device comprising a planetary gearing consisting of a driving shaft, a driven shaft, a spur wheel on each shaft, planet wheels engaging said spur wheels, an inwardly toothed ring surrounding and engaging the said spur wheels, a casing in which the said planet wheels are journaled, brake bands one surrounding the said ring and another the casing to form band brakes, two armed levers to the end of which the brake bands are attached, a pivot rod which is mounted parallelly to the axis of the planetary gearing and on which the said levers are adapted to rock and to slide to a limited extent, a cam shaft journaled parallel to the axis of the gearings to one side of the first rod, cams on said cam shaft opposite the said levers to positively guide each lever, the cam shaft operatively connected with driving means to compel the levers to move in prescribed paths, a frame in which the pivot rod and the cam shaft are journaled and which is adapted to be moved towards the axis of the gearing to loosen the brake bands.

8. A speed controlling device comprising a planetary gearing consisting of a driving shaft, a driven shaft, a spur wheel on each shaft, planet wheels engaging said spur wheels, an inwardly toothed ring surrounding and engaging the said spur wheels, a casing in which the said planet wheels are journaled, brake bands one surrounding the said ring and an other the casing to form band brakes, two armed levers to the end of which the brake bands are attached, a pivot rod which is mounted parallelly to the axis of the planetary gearing and on which the said levers are adapted to rock and to slide to a limited extent two cam shafts journaled parallel to the axis of the gearings each to one side of the rod, cams on said cam shafts opposite the said levers to positively guide each lever on both sides of the pivot rod, the tow cam shafts operatively connected with one another to move in unison to compel the levers to move in prescribed paths, a frame in which the pivot rod and the cam shaft are journaled and which is adapted to move towards the axis of the gearing to loosen the brake bands.

9. A speed controlling device comprising a planetary gearing consisting of a driving shaft, a driven shaft, a spur wheel on each shaft, planet wheels engaging said spur wheels, an inwardly toothed ring surrounding and engaging the said spur wheels, a casing in which the said planet wheels are journaled, brake bands one surrounding the said ring and another the casing to form band brakes, two armed levers to the ends of which the brake bands are attached, a pivot rod which is mounted parallelly to the axis of the planetary gearing and on which the said levers are adapted to rock and to slide to a limited extent, two cam shafts journaled parallel to the axis of the gearings each to one side of the first rod, cams on said cam shafts opposite the said levers to positively guide each lever on both sides of the pivot rod, the two cam shafts operatively connected with one another to move in unison to compel the levers to move in prescribed paths, an oscillatory frame on which the pivot rod and the cam shafts are journaled, a casing, a slide guided to move parallel to the axis of the gearing, cam slots in the slide, bearing studs at the end of the oscillatory frame and engaging the said cam slots to oscillate the said frame by the longitudinal movement of the slide, and a foot lever engaging the slide to reciprocate said slide.

10. A speed controlling device according to claim 9, characterized in this that the foot lever is adapted to operate also the lever of the usual brake clutch.

11. A speed controlling device comprising a planetary gearing consisting of a driving shaft, a driven shaft, a spur wheel on each shaft, planet wheels engaging said spur wheels, an inwardly toothed ring surrounding and engaging the said spur wheels, a casing in which the said planet wheels are journaled brake bands one surrounding the said ring and another the casing to form band brakes, two armed levers to the ends of which the brake bands are attached, a pivot rod which is mounted parallelly to the axis of the planetary gearing and on which the said levers are adapted to rock and to slide to a limited extent a cam shaft journaled parallel to the axis of the gearings to one side of the first rod, cams on said cam shaft opposite the said levers to positively guide each lever, the cam shaft operatively connected with driving means to compel the levers to move in prescribed paths, means to lower the pivot rod to loosen the brake band, said means being connected with means to lock the gearing.

12. A speed controlling device comprising a planetary gearing consisting of a driving shaft, a driven shaft, a spur wheel on each shaft, planet wheels engaging said spur wheels, an inwardly toothed ring surrounding and engaging the said spur wheels, a casing in which the said planet wheels are journaled, brake bands one surrounding the said ring and an other the casing to form band brakes, two armed levers to the ends of which the brake bands are attached, a pivot rod which is mounted parallelly to the axis of the planetary gearing and on which the said levers are adapted to rock and to slide to a limited extent, two cam shafts journaled parallel to the axis of the gearings each to one side of the rod, cams on said cam shaft opposite the said levers to positively guide each lever on both sides of the pivot rod, the two cam shafts operatively connected with one another to move in unison to compel the levers to move in prescribed paths, a lever rotatably mounted on the pivot rod and adapted to engage a cam on one of the said cam shafts, means to lock the gearing and a link to connect the means to lock the gearing with said lever mounted on the pivot rod.

13. A speed controlling device comprising a planetary gearing consisting of a driving shaft and a driven shaft arranged in line with the driving shaft, each shaft carrying a spur wheel, the two spur wheels being of different diameter, a casing rotatably journalled on the shaft and forming the disk of a band brake, stepped planet wheels rotatably journaled in the walls of said casing and engaging the said spur wheels, a ring having inner teeth engaging one step of the said planet wheels, a brake band passing round the said ring and forming therewith a band brake, a second brake band passing round the casing and constituting a second band brake, one part of the casing constructed as a friction disk, a special spring pressed friction disk slidably but not rotatably mounted on one of the shafts, various speeds being adapted to be put in by either pressing the spring pressed friction disk against the friction disk of the casing or by applying one or the other brake.

14. A speed controlling device according to claim 1, a cam shaft parallel to said pivot rod and a cam on said shaft for each lever, said cam bearing against the shorter arm of said lever.

15. A speed controlling device according to claim 1, a cam shaft parallel to said pivot rod and a cam on said shaft for each lever, said cam bearing against the shorter arm of said lever the pivot rod being so positioned that the brake band in all positions of the lever forms with the lever an obtuse angle.

16. A speed controlling device according to claim 1, a cam shaft parallel to said pivot rod, a cam on said shaft for each lever, said cam bearing against the shorter arm of said lever and means to guide the longer arm of each lever to compel the levers to move in prescribed paths.

17. A speed controlling device according to claim 1, a cam shaft parallel to said pivot rod, a cam on said shaft for each lever, said cam bearing against the shorter arm of said lever, means to guide the longer arm of each lever to compel the levers to move in prescribed paths, and a frame carrying the said cam-shaft the said pivot rod and the means to guide the longer arm of the levers.

18. A speed controlling device according to claim 1, a cam shaft parallel to said pivot rod, a cam on said shaft for each lever, said cam bearing against the shorter arm of said lever and means to guide the longer arm of each lever to compel the levers to move in prescribed paths, the said pivot rod being adapted to be lowered to loosen the brake bands.

19. A speed controlling device according to claim 1, a cam shaft parallel to said pivot rod, a cam on said shaft for each lever, said cam bearing against the shorter arm of said lever, means to guide the longer arm of each lever to compel the levers to move in prescribed paths, means for lowering said pivot rod to loosen the brake bands and an operating lever actuating said pivot rod lowering means and adapted to operate the lever of the usual brake clutch.

20. A speed controlling device according to claim 1, a cam shaft parallel to said pivot rod, a cam on said shaft for each lever said cam bearing against the shorter arm of said lever, and an operating lever operatively connected with said cam shaft to enable operation and recognization of the position of the cam shaft.

21. A speed controlling device according to claim 1, a cam shaft parallel to said pivot rod, a cam on said shaft for each lever, said cam bearing against the shorter arm of said lever, and locking means for the gearing, said locking means being operated by the means for operating the cams.

22. A speed controlling device according to claim 1, a cam shaft parallel to said pivot rod, a cam on said shaft for each lever said cam bearing against the shorter arm of said lever, a lever rotatably mounted on the pivot rod, a special cam on the cam shaft adapted to be engaged by the said rotatable lever, means to lock the gearing and a link to connect the means to lock the gearing with said lever mounted on the pivot rod.

23. A speed controlling device according to claim 1, a cam shaft parallel to said pivot rod, a cam on said shaft for each lever, said cam bearing against the shorter arm of said lever and means to guide the longer arm of each lever to compel the levers to move in prescribed paths, means for lowering the pivot rod to loosen the brake bands, and means to lock the gearing, said means being connected with the means to lower the pivot rod.

ERICH FRIEDRICH PULS.